Sept. 25, 1934.  D. I. DAVIS  1,974,796
SKILLET
Filed Nov. 9, 1932    2 Sheets-Sheet 1
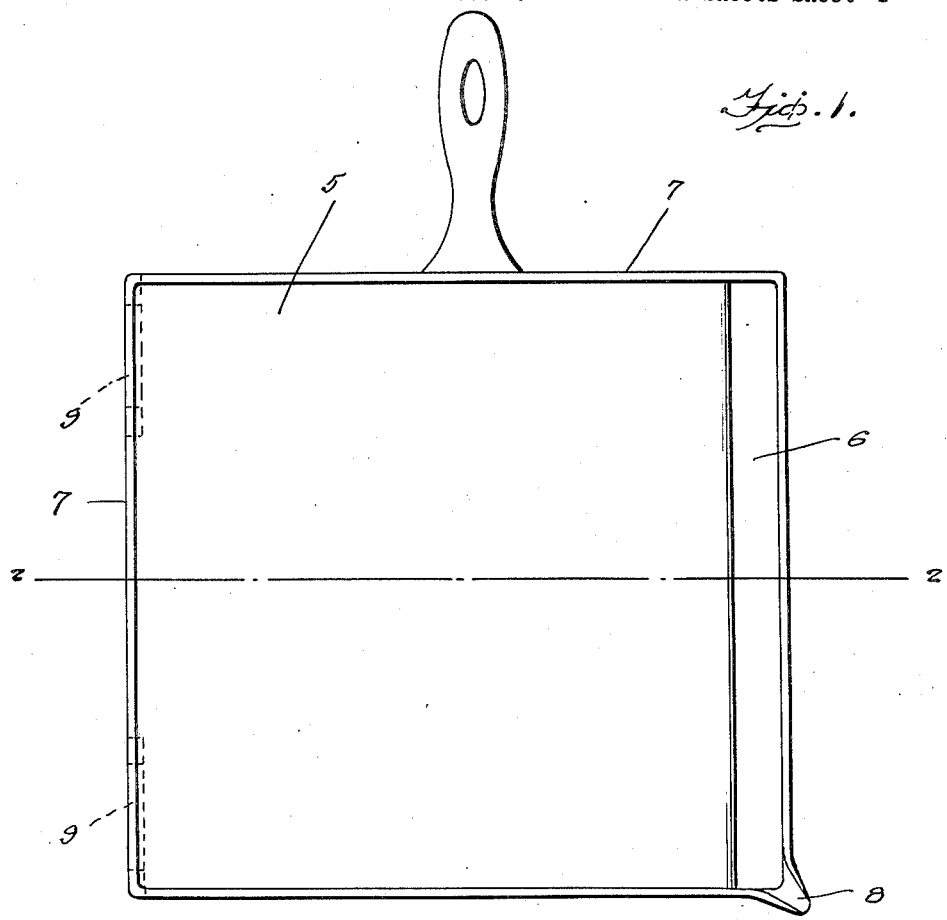
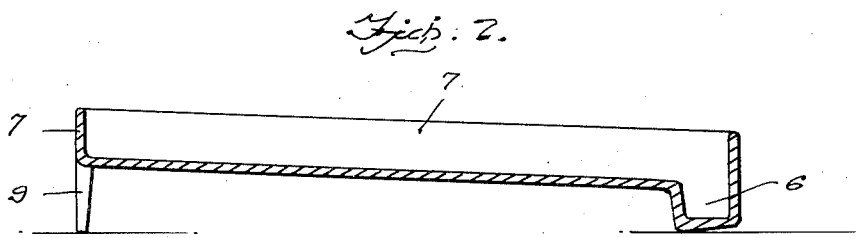
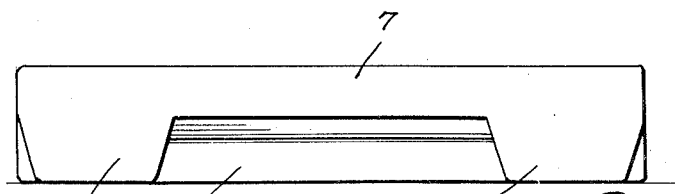
Inventor
D. I. Davis
By Clarence A. O'Brien
Attorney Sept. 25, 1934.    D. I. DAVIS    1,974,796
SKILLET
Filed Nov. 9, 1932    2 Sheets-Sheet 2

Inventor
D. I. Davis
By Clarence A. O'Brien
Attorney

Patented Sept. 25, 1934

1,974,796

UNITED STATES PATENT OFFICE 1,974,796

SKILLET

David I. Davis, El Paso, Tex.

Application November 9, 1932, Serial No. 641,914

3 Claims. (Cl. 219—44)

This invention appertains to new and useful improvements in domestic cooking utensils and more particularly to a novel skillet which has as its principal object, the provision of means whereby the same is self-draining.

Another important object of the invention is to provide a self-contained cooking utensil having electrical heating means incorporated therein and additional means making the device self draining of grease on its cooking surface.

Other important objects and advantages of the invention will become apparent to the reader of the following specification.

In the drawings:—

Figure 1 represents a top plan view of the utensil.

Fig. 2 represents a sectional view taken substantially on line 2—2 of Fig. 1.

Fig. 3 represents a side elevational view of the utensil.

Figure 4:
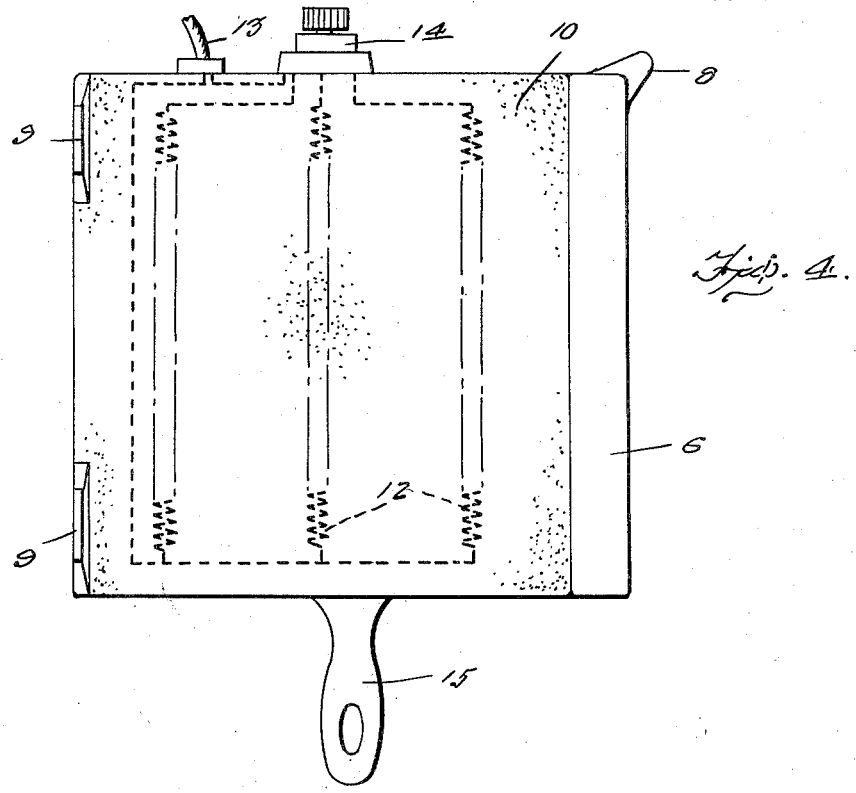
Fig. 4 represents a bottom plan view of the device, equipped with heating means.
Figure 5:
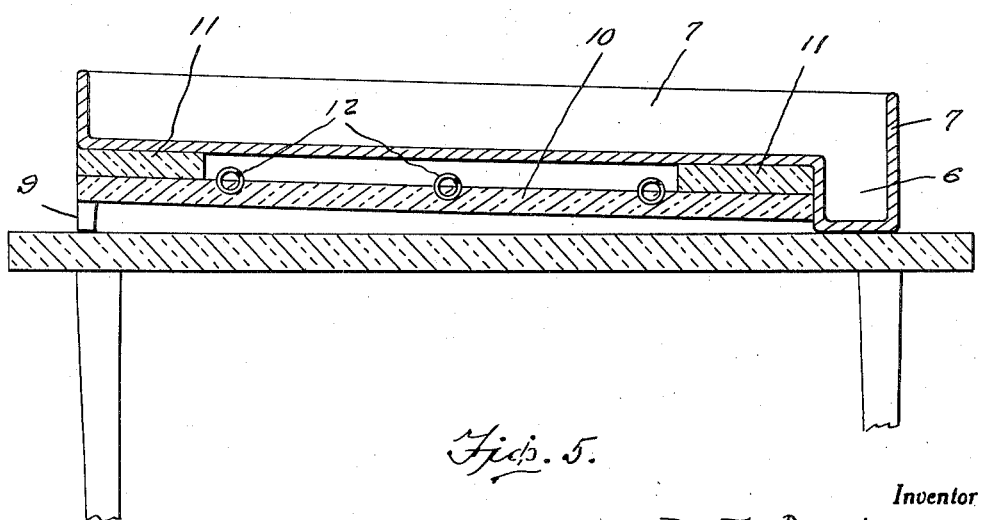
Fig. 5 represents a vertical sectional view through the device as modified in Fig. 4.

Referring to the drawings wherein like numerals designate like parts, it can be seen that the skillet consists of an inclined hot plate 5 formed at one edge portion with a depression defining a trough 6 in complement with the side walls 7 which extend around the perimeter of the plate 5 and trough 6. At one side of the trough 6 the merging side walls 7 are deformed to provide a pouring lip 8. When the device is in use, the same is supported at one end portion by the bottom of the trough 6, and at its opposite edge portion by the legs 9, these legs being of sufficient length to maintain the plate 5 at a substantial inclination so that during a normal cooking operation, grease will drain down the plate and into the trough 6.

To establish the device as a self-contained utensil, a di-electric plate 10 can be attached to the bottom of the hot plate 5 and spaced therefrom at its central point by spacing blocks 11. Mounted upon the central point of the plate 10 are the heating coils 12 which attach to the electricity supply line 13, by way of a switch 14.

A handle 15 projects from one side wall of the utensil so that the device is available for portable use. Obviously in regreasing the pan, all that is necessary is to tilt the device so that some of the grease will run out of the trough 6 and onto the hot plate 5. This promotes more uniform cooking, and prevents excessive use of grease.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A portable frying pan comprising an inclined hot plate, a trough at the lower end of the hot plate, a wall extending around the perimeter of said hot plate, and a handle projecting from the wall.

2. A portable frying pan comprising a hot plate having a handle, a trough at one end of the hot plate, and legs at the opposite end of the hot plate for supporting the hot plate in an inclined position with respect to the trough.

3. A frying pan comprising a hot plate having a handle, a trough at one end of the hot plate acting as a support for said end of the plate, legs at the opposite end of the hot plate for maintaining the hot plate in an inclined position with respect to the trough.

DAVID I. DAVIS.